United States Patent
Paul et al.

(10) Patent No.: US 6,721,878 B1
(45) Date of Patent: Apr. 13, 2004

(54) LOW-LATENCY INTERRUPT HANDLING DURING MEMORY ACCESS DELAY PERIODS IN MICROPROCESSORS

(75) Inventors: Somnath Paul, Milpitas, CA (US); Gregory H. Efland, Palo Alto, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 416 days.

(21) Appl. No.: 09/594,218

(22) Filed: Jun. 14, 2000

(Under 37 CFR 1.47)

(51) Int. Cl.[7] ............................................. G06F 13/00
(52) U.S. Cl. ...................................... 712/244; 710/260
(58) Field of Search ............................ 712/244, 40, 41, 712/220, 218, 219, 241; 710/260, 262, 264, 267, 269, 263, 22, 40; 711/202–210; 714/5–7

(56) References Cited

U.S. PATENT DOCUMENTS

| | | | | |
|---|---|---|---|---|
| 4,456,970 A | * | 6/1984 | Catiller et al. | 710/48 |
| 4,495,571 A | * | 1/1985 | Staplin et al. | 710/113 |
| 4,716,523 A | * | 12/1987 | Burrus et al. | 710/28 |
| 5,625,835 A | * | 4/1997 | Ebcioglu et al. | 712/23 |
| 5,913,045 A | * | 6/1999 | Gillespie et al. | 710/311 |
| 5,943,507 A | * | 8/1999 | Cornish et al. | 710/48 |
| 6,425,039 B2 | * | 7/2002 | Yoshioka et al. | 710/269 |

* cited by examiner

Primary Examiner—Henry W. H. Tsai
(74) Attorney, Agent, or Firm—Kevin L. Daffer; Conley Rose P.C.

(57) ABSTRACT

A method and processor configured to handle an exception may employ a "retry" signal, which may be associated with a memory access attempt by the processor. The retry signal determines if an exception is to be serviced during a period in which the memory access is delayed. In one embodiment for which the exception is an interrupt, the retry signal is asserted when memory access is delayed and the processor may proceed to service an interrupt request during this period of delayed memory access, regardless of the degree of completion of an instruction by the processor. During a period of delayed memory access, the processor may suspend instruction execution until the memory access becomes available. Upon completion of servicing the interrupt, the processor may resume instruction execution beginning with the last instruction attempted before the suspension of the instruction execution due to the delayed memory access. In one embodiment, the processor may include interrupt handling logic to enable initiation of interrupt service in response to an interrupt request and may further include address selection logic to select an instruction address associated with a delayed memory access.

17 Claims, 8 Drawing Sheets

LOW-LATENCY INTERRUPT HANDLING DURING MEMORY ACCESS DELAY PERIODS IN MICROPROCESSORS

BACKGROUND OF THE INVENTION

1. Field of the Invention

This disclosure relates to computer processor operation, and more particularly to handling of exceptions such as an interrupt request during a period in which the processor is waiting for completion of a memory access.

2. Description of the Related Art

Microprocessors determine the speed and power of personal computers, and a growing number of other computational devices (such as appliances, telephones or personal digital assistants) by handling most of the data processing in the device. Microprocessors typically include at least three functional groups: the external interface unit, the control unit, and the arithmetic logic unit (ALU). The control and the ALU units combine to form the central processing unit (CPU). The microprocessor also includes memory to store program instructions to be executed. The CPU fetches instructions from the memory and proceeds to decode and execute them. Within the CPU, the ALU handles the mathematical computations and logical operations that are performed by the microprocessor, and the control unit controls the operation of the microprocessor by fetching instructions from the external interface unit and translating the instructions into a form that can be understood by the ALU. In addition, the control unit keeps track of which step within the instruction is being executed.

Most modern microprocessors employ various design methods to improve the processing speed for executing a set of instructions. These include pipelining, speculative and out-of-order execution, and multiple instruction fetch. Pipelining is a key design technique employed to improve processing speed and employs multiple instructions overlapped in execution. Thus, pipelining increases the CPU instruction throughput but it does not reduce the execution time of an individual instruction. Practically all microprocessors today employ some level of pipelining to improve processing speed. A pipeline consists of sequential stages, wherein each stage completes a part of an execution of an instruction passing through the pipeline. Thus, different stages in the pipeline are completing parts of different instructions in parallel. Each of these stages is commonly referred to as a pipe stage. These pipe stages are connected sequentially to form a pipe, where instructions enter at one end., proceed through the pipe stages, and exit at the other end.

There are many factors influencing a microprocessor system's operational speed. One of these factors is exception handling. Exceptions arise in a microprocessor system whenever there is a need for the normal flow of program execution to be broken. For example, this flow may be broken so that the microprocessor can be diverted to handle an interrupt from an external I/O device. An interrupt causes a microprocessor to suspend execution of the current task being performed by the CPU in order to execute a specific software routine, known as an interrupt service routine (ISR). This routine comprises a set of software instructions typically unrelated to the instructions being executed by the microprocessor at the time the interrupt is signaled. An interrupt request is often initiated, for example, by an external I/O device to signal that the I/O device is ready for a data transfer.

In a typical interrupt sequence, the I/O device, or "peripheral", first sends an interrupt request signal to the microprocessor requesting a data transfer service. In the case of a pipelined processor, a "breakpoint" is typically established in the pipeline, at which point the sequence of instructions in the pipeline can be interrupted relatively conveniently. Instructions scheduled for execution after this breakpoint are discarded from the pipeline, and instructions scheduled for execution before this breakpoint are allowed to complete during subsequent execution of the pipeline. In the case of a non-pipelined microprocessor, the microprocessor typically finishes the instruction currently being processed prior to handling the interrupt request. Either before execution of or as a part of the ISR, the contents of critical registers may be stored into pre-assigned memory locations for use in resumption of the main program subsequent to servicing the interrupt request. The processor also stores the contents of the program counter prior to the ISR. The program counter allows the processor to track which location in program memory the processor may go to fetch the instruction and typically contains the address of the next instruction to be fetched. After the above-described preparatory actions are done, the microprocessor proceeds to execute the ISR. Service of the interrupt may therefore include these preparatory actions such as discarding instructions from the pipeline as well as execution of the ISR. After completion of the ISR (or sometimes as part of the routine), data from the stored critical registers and program counter are reloaded back into their respective memory locations such that the microprocessor is then restored back to its "pre-interrupt" status and proceeds to resume execution of the main program.

The time (typically measured in clock cycles) between when the initial interrupt request occurs and the execution of the ISR is started may be defined as the overall latency associated with handling an interrupt. This overall latency includes any latency associated with establishing a breakpoint and clearing pipeline instructions (described herein as "interrupt pipeline latency"). Another component of the overall latency may include, for example, any latency associated with disabling service of the interrupt for a period of time to allow execution of critical instructions to complete unperturbed.

In addition to the latency components described above, additional contributions to the overall latency can be incurred in situations for which the processor is waiting for completion of an instruction that was executing when the interrupt was received. For example, in an instruction calling for a memory access, the memory access may not be able to be completed in the current clock cycle, and the microprocessor is forced to simply wait until the memory access can be completed in a subsequent clock cycle. In other words, the microprocessor may not be able to perform other tasks or execute further instructions due to this delay in the memory access. This latency, defined herein as interrupt memory delay latency, measures the time it takes for the microprocessor to perform the memory access before beginning interrupt service. Depending on memory configurations used in the microprocessor system, this latency can be quite long. Such latency can be present, for example, in multi-microprocessor systems in which the microprocessors interface with a pooled memory system, or in a microprocessor system for which some memories have slow access times compared to the speed of the microprocessor.

Ideally, the overall interrupt latency should be as low as possible to increase overall microprocessor system performance. Long overall interrupt latencies of I/O devices can detrimentally affect the overall speed of the program being executed, particularly when the program calls for real-time data transfer between I/O devices and the microprocessor. For example, in a streaming video application which requires a minimum data transfer rate to sustain the amount of data required to provide smooth and seamless motion-video, long interrupt latencies between the microprocessor and the video graphics system can cause many frames of the video to be dropped during playback.

It would therefore be desirable to provide a method and system for handling exceptions such as an interrupt request with low overall latency to improve microprocessor system performance.

SUMMARY OF THE INVENTION

The issues described above are in large part addressed by a method and processor for handling an exception received by the processor, where service of the exception is initiated while waiting for completion of a memory access attempt by the processor. In an embodiment, the processor employs a "retry" signal in a determination of whether to initiate service of an exception received in response to the exception. The retry signal is associated with a memory access attempt by the microprocessor. In particular, the retry signal may be asserted when a memory access is delayed. The retry signal in this case corresponds to a suspension of the instruction execution by the processor until the memory access is completed and the retry signal de-asserted. In one embodiment, the exception may be an interrupt. Advantageously then, employing the retry signal may result in lower overall interrupt latency for interrupts occurring during a period of delayed memory access. During a period of delayed memory access, the processor typically is forced to wait until the memory access is available upon which execution of instructions may then resume. If an interrupt request occurs during this period, service of the interrupt request would also be delayed until at least after the memory access becomes available. In contrast, this interrupt memory delay latency may be reduced and possibly completely avoided by employing the retry signal such that an interrupt request may be serviced during this period of delayed memory access. This would result in a reduction in overall interrupt latency. In addition, it may also result in increasing processor bandwidth performance (i.e., number of instructions per second), due to the fact that the processor is no longer idling during the delayed memory access, but instead performing operations on an interrupt request.

In an embodiment of a method described herein for handling an exception, the status (asserted or non-asserted) of the retry signal is employed in a determination of whether to initiate service of the: exception received in response to the exception. In an embodiment for which the exception is an interrupt signal, the interrupt service may be initiated if the retry signal is asserted, regardless of a degree of completion of an instruction by the processor. This is in contrast to waiting until completion of the current instruction before starting interrupt service, as is typically done. In one embodiment, the initiation of the interrupt service is performed within a predetermined time interval after receiving an asserted interrupt and may be performed in response to the subsequent clock signal following receiving the asserted interrupt during an asserted retry signal. The method may further comprise completing the interrupt service and subsequently resuming instruction execution by the processor, where the instruction execution is resumed beginning with a last instruction attempted before the suspension of the instruction execution by the processor. This last instruction attempted is typically the memory access attempted by the processor Which resulted in the asserted retry signal and the suspension of instruction execution.

A processor suitable for use with a method such as that described above is also described herein. In one embodiment, the processor includes interrupt handling logic adapted to produce an interrupt service initiation signal which, when asserted, enables initiation of interrupt service in response to an interrupt request signal. The interrupt service initiation signal is produced as a function of the interrupt request signal and the retry signal described above. In an embodiment, the interrupt service initiation signal is asserted when both the interrupt request signal and the retry signal are asserted. The interrupt handling logic, in one embodiment, includes a first circuit adapted to generate an asserted first output signal when either the retry signal or an instruction completion signal are asserted, in which the instruction completion signal is associated with completion of a last portion of an instruction execution. The interrupt handling logic may further include a second circuit adapted to generate an asserted second output signal when both the interrupt request signal and the first output signal are asserted. The interrupt service initiation signal may be produced upon an output terminal, and a latching circuit may be employed to transfer the second output signal to the output terminal to produce the interrupt service initiation signal.

In another embodiment of a processor suitable for use with the method described herein, the processor includes address selection logic adapted to select an instruction address as a function of the retry signal and an interrupt service initiation signal as described above. The address selection logic, in one embodiment, includes a first circuit adapted to generate an asserted first output signal when both the retry signal and the interrupt service initiation signal are asserted. The address selection logic may further include a second circuit adapted to select the instruction address as a function of the first output signal. In an embodiment for which the retry signal is asserted, for example, the second circuit may select an instruction address of the memory access which was delayed and caused the retry signal to be asserted. In an embodiment, the second circuit may include a selection circuit having its output connected to one of two inputs. The processor may further include interrupt handling logic as described above, to produce the interrupt service initiation signal as a function of the interrupt request signal and the retry signal.

BRIEF DESCRIPTION OF THE DRAWINGS

Other objects and advantages of the invention will become apparent upon reading the following detailed description and upon reference to the accompanying drawings in which.

Figure 1:
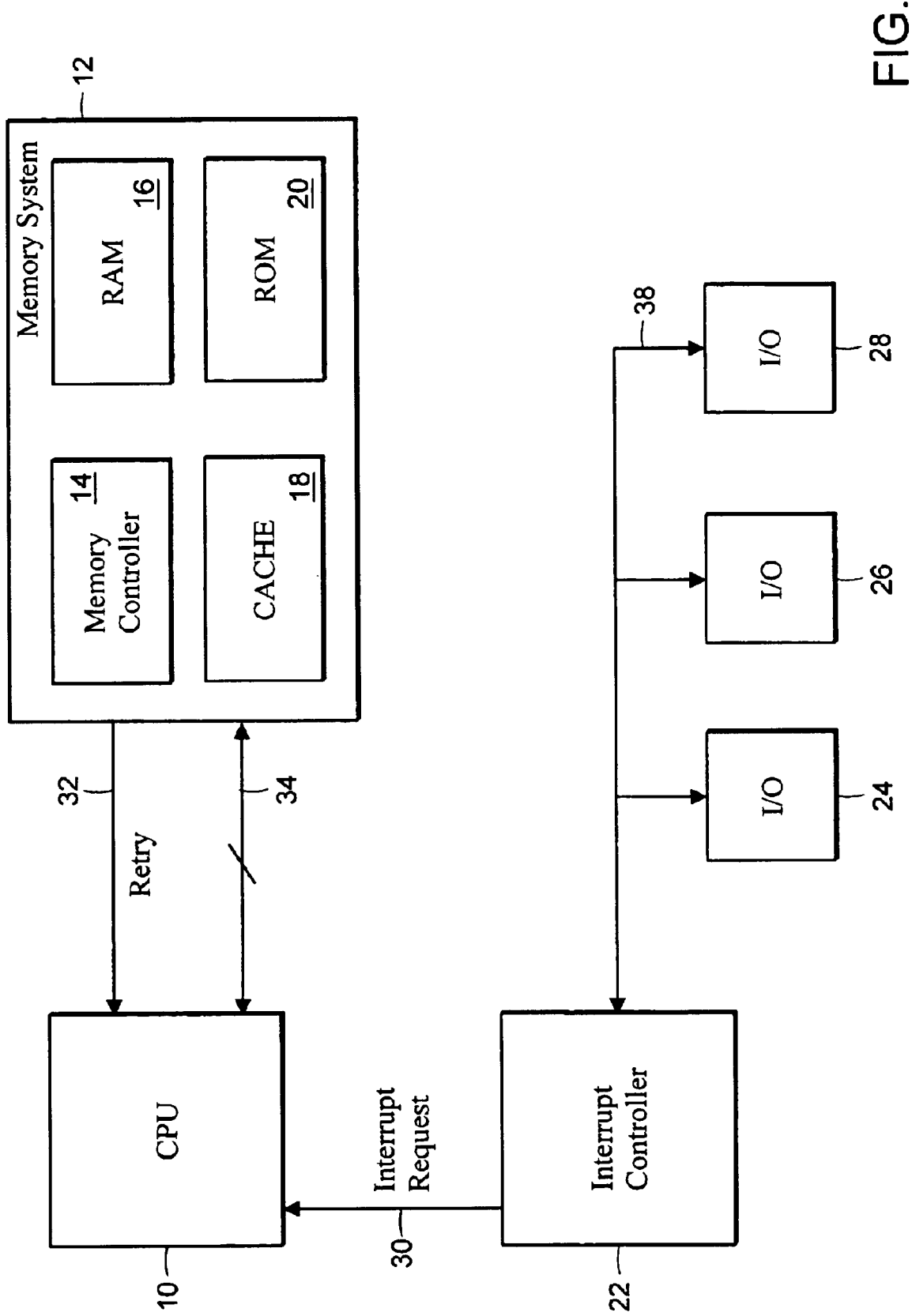
FIG. 1 is a block diagram illustrating one embodiment of a computer system employing a retry signal.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a block diagram illustrating one embodiment of a computer system employing retry signal 32. Central Processing Unit (CPU) 10 interfaces with memory system 12 via memory bus 34. CPU 10 may be a pipelined or a non-pipelined processor. Memory bus 34 serves as the connection path wherein data transfers to and from memory system 12 to CPU 10 takes place. In one embodiment, memory bus 34 may be a 32-bit bus path. In other embodiments, different bus widths may be employed such as a 64-bit bus or a 128-bit bus. Memory system 12 may comprise a plurality of memory types, some of which include Random Access Memory (RAM) 16, Static Random Access Memory (SRAM) 18 or other cache memories, and Read Only Memory (ROM) 20. Memory system 12 may also comprise memory controller 14, which may serve to direct memory access to and from CPU 10 and memory system 12. Retry signal 32 is directed from memory system 12 to CPU 10 and serves to indicate a status of a memory access by CPU 10 from memory system 12. In one embodiment, retry signal 32 is asserted when memory access is delayed to a subsequent clock cycle and non-asserted when memory access is available in the current clock cycle. The status of retry signal 32 may be controlled through memory controller 14.

In the embodiment of FIG. 1, interrupt controller 22 interfaces with a plurality of I/O peripherals 24, 26, and 28 through connection 38. In this example, three I/O peripherals are shown but less or more I/O peripherals may be interfaced with interrupt controller 22. Some examples of I/O peripherals include magnetic hard drives, optical hard drives, magnetic tape drives, printers, modems, sound cards, keyboards, mice, video graphics cards, floppy drives, CD-ROM drives, and DVD-ROM drives. Whenever one or more I/O peripherals 24, 26, and 28 need servicing by CPU 10, a peripheral interrupt request is sent from the I/O peripheral(s) through connection 38 to interrupt controller 22. Interrupt controller 22 prioritizes the peripheral interrupt requests and sends an interrupt request signal via connection 30 to CPU 10. The interrupt request signal notifies CPU 10 that one or more I/O peripherals such as 24, 26, and 28 need service and so that interrupt service to the requesting I/O peripheral(s) may be performed by CPU 10.

In FIG. 1, the blocks are intended to represent functionality rather than specific structure. Implementation of the represented device using circuitry and/or software could involve combination of multiple blocks into a single circuit, or combination of multiple circuits to realize the function of that block. For example, memory controller 14 may possibly be included with CPU 10 in some embodiments. Furthermore, some or all elements of memory system 12 may be embedded in CPU 10 in some embodiments. In such embodiments, memory bus 34 and retry signal 32 may be internally connected to CPU 10.

Figure 2:
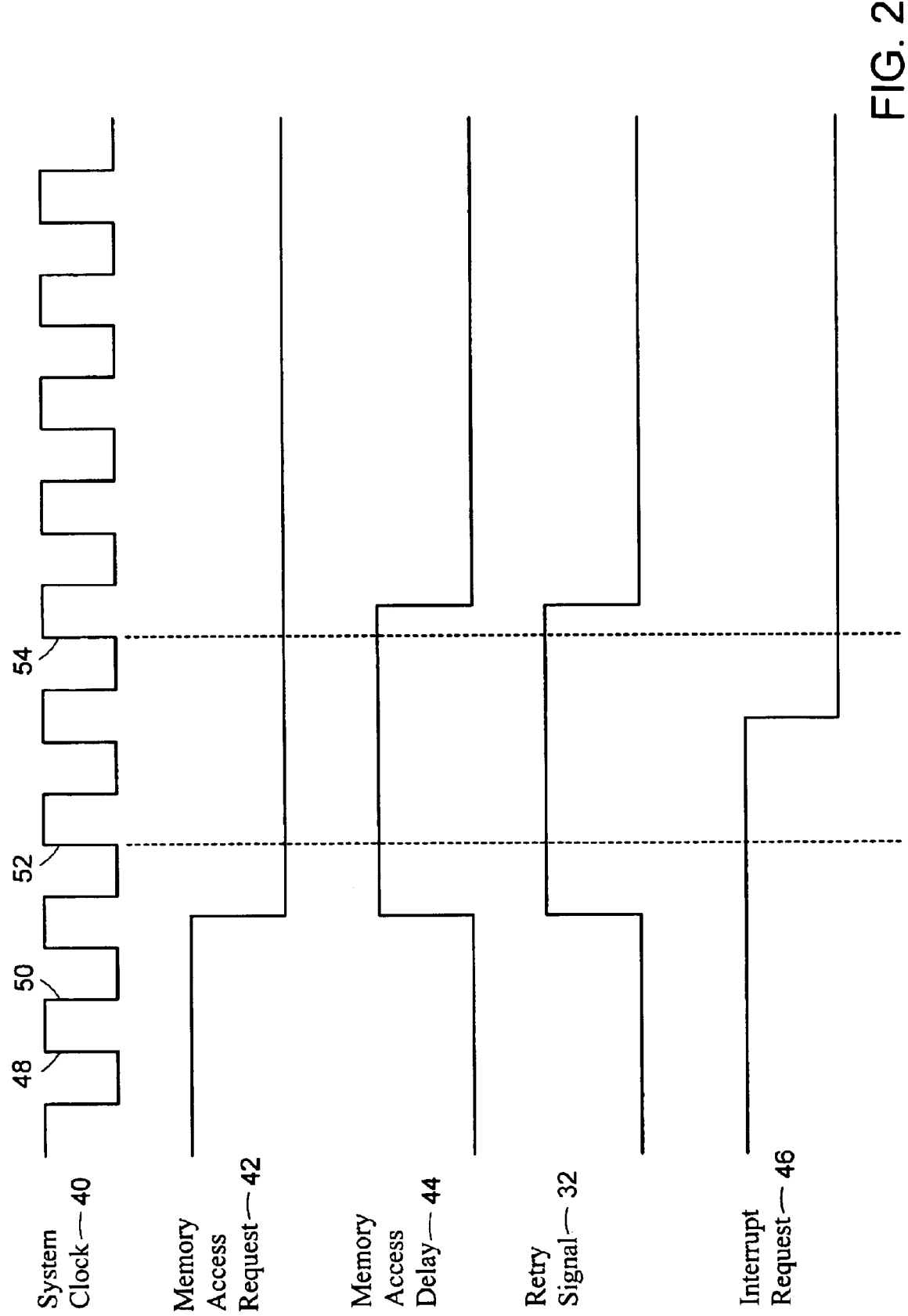
FIG. 2 is a timing diagram illustrating an exemplary sequence of signals in a system such as that of FIG. 1.

FIG. 2 shows one embodiment of a timing diagram for a computer system such as that of FIG. 1, employing retry signal 32 of FIG. 1. The computer system may comprise system clock 40, memory access request signal 42, memory access delay signal 44, interrupt request signal 46, and retry signal 32. Although described herein as single signals, the memory access delay and/or retry states could be indicated in other ways, such as being sent across a bus. For example, retry state could be indicated using memory bus 34 of FIG. 1, rather than using the separate line shown in FIG. 1. In the embodiment to be discussed further below, the computer system employs a positive triggering system, wherein actions are performed on rising edge 48 of a cycle of system clock 40. It is noted that the discussion is also applicable to a computer system employing a negative triggering system, wherein actions are performed on falling edge 50 of a cycle of system clock 40 or actions are performed on both falling edge 50 and rising edge 48 of a cycle of system clock 40. The embodiment further employs active-low signals for memory access request signal 42 and interrupt request signal 46. In other words, a low voltage of the signal corresponds to presence of the state indicated by the interrupt request or memory access request signal. An active-low signal is also said to be "asserted" when low. In the embodiment of FIG. 2, memory access delay signal 44 and retry signal 32 employ active-high signals, on the other hand. In this case, a high voltage of the signal corresponds to presence of the state indicated by the memory access delay signal and the retry signal. An active-high signal is also said to be "asserted" when high. Other embodiments may employ either active-high or active-low signals for memory access request signal 42, memory access delay signal 44, interrupt request signal 46, retry signal 32 and any other signals which may be employed.

The states of memory access delay signal 44 and retry signal 32 track each other; whenever memory access delay signal 44 is asserted, retry signal 32 is asserted and whenever memory access delay signal 44 is non-asserted, retry signal 32 is non-asserted. In other words, retry signal 32 is asserted whenever a memory access by CPU 10 is not available during the current clock cycle and retry signal 32 is non-asserted whenever a memory access by CPU 10 is available during the current clock cycle. During an asserted memory access delay signal 44, CPU 10 is in a wait state and the current instruction execution may be suspended until memory access delay signal 44 is non-asserted in a subsequent clock cycle. CPU 10 may then resume instruction execution. The period in which CPU 10 is idling during an asserted memory access delay signal 44 degrades CPU 10 performance due to a reduction in processor bandwidth. No executions are occurring during this period by CPU 10 and thus the number of instructions per second completed may be reduced to zero. If interrupt request signal 46 were asserted during this period in the absence of retry signal 32, service of the interrupt would have been delayed until at least memory access delay signal 44 becomes non-asserted. This delay corresponds to the above-described interrupt memory delay latency, which is a component of the overall interrupt latency. To improve overall interrupt latency, reducing the interrupt memory delay latency by servicing an asserted interrupt request signal 46 during an asserted retry signal 32 would allow CPU 10 to improve both processor bandwidth and overall interrupt latency performance.

As noted above, memory access delay signal 44 and retry signal 32 track each other. Either signal may be employed in the circuits to be described herein to indicate a status of a memory access attempt. In the preferred embodiment, retry signal 32 is employed. Memory access delay signal 44 is provided for further clarification on the relationship between retry signal 32 and a memory access by a processor as outlined in the above-described paragraph.

As further shown in FIG. 2, the combination of signals described above may occur during a clock cycle 52 of system clock 40. At the rising edge of clock cycle 52, memory access request signal 42 is asserted, memory access delay signal 44 is asserted, retry signal 32 is asserted and interrupt request signal 46 is non-asserted. This describes a state in which CPU 10 is idling and instruction execution has been suspended due to a delay in memory access. At the rising edge of clock cycle 54, memory access request signal 42 is asserted, memory access delay signal 44 is asserted, retry signal 32 is asserted, and interrupt request signal 46 is asserted. This describes a state in which an interrupt request has occurred while CPU 10 is idling and instruction execution has been suspended due to a delay in memory access and an interrupt request occurs. As discussed above, by servicing the interrupt request during this state, overall interrupt latency and processor bandwidth performance may be improved.

The embodiment as described above in FIG. 2 may further include a retry abort signal (not shown), which may be used to communicate the condition in which an interrupt request is serviced during an asserted retry signal 32. This may result in aborting the memory access attempt by CPU 10, which is being delayed by retry signal 32. An asserted retry abort signal may be received by memory system 12 from CPU 10, which may inform memory system 12 to de-assert retry signal 32.

Figure 3:
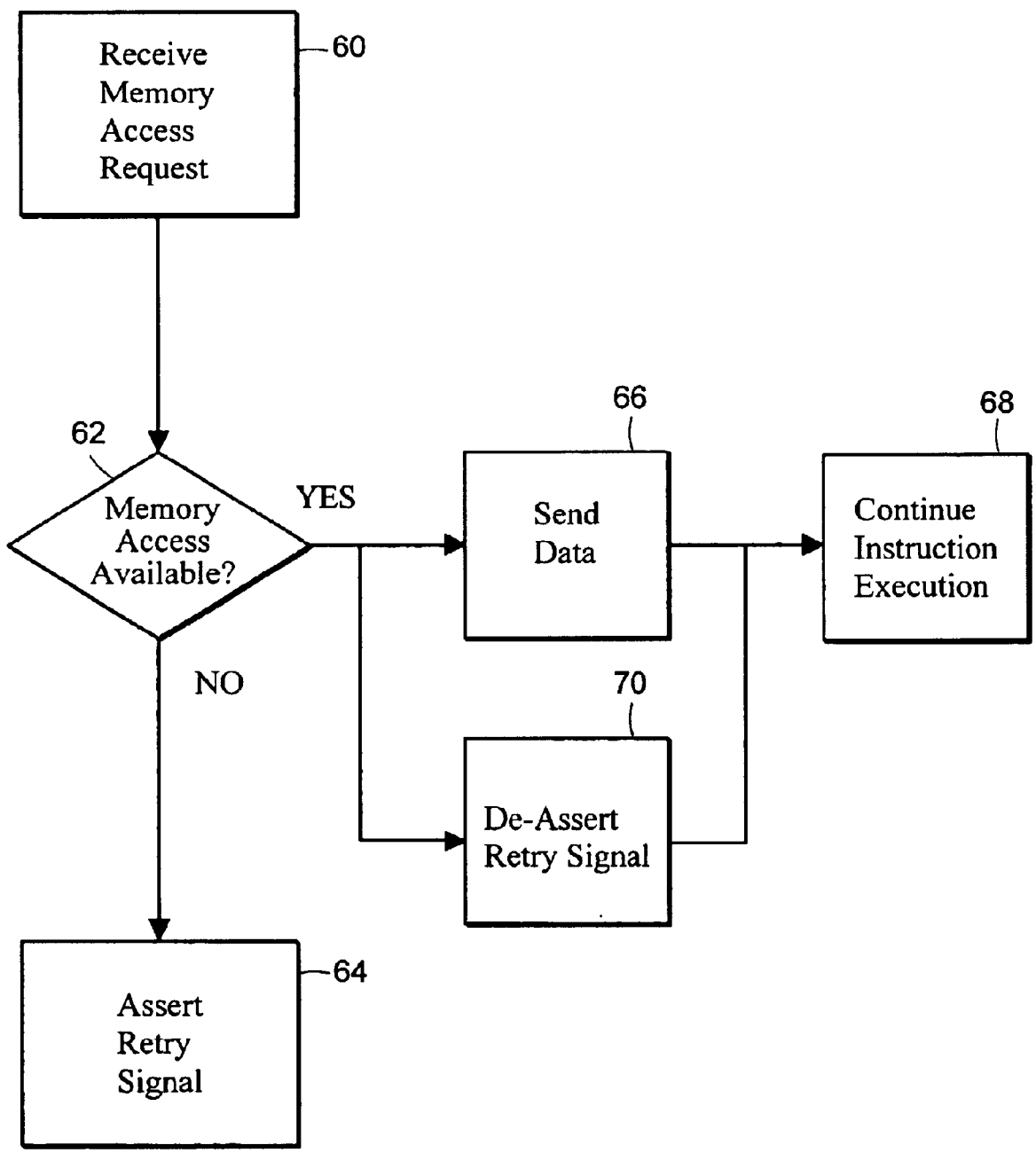
FIG. 3 is a method flow diagram showing one embodiment of a method of employing a retry signal in response to a memory access request.

FIG. 3 illustrates one embodiment of a method of employing a retry signal in response to a memory access request by a processor such as CPU 10. The method of FIG. 3 may be performed by a memory controller such as memory controller 14 of FIG. 1. This method and other methods described herein are described with reference to items shown in other figures as appropriate. A memory access request to a memory system such as memory system 12 is received, as shown in block 60. If the data requested in the memory access is available ("yes" branch of decision box 62), the requested data is sent back to CPU 10 to continue instruction execution as shown in blocks 66 and 68 respectively. Retry signal 32 is also de-asserted as shown in block 70. In contrast, if the memory access is not available, retry signal 32 is asserted and is sent back to CPU 10 to notify of a memory access delay in the current clock cycle, as shown in block 64.

Figure 4:
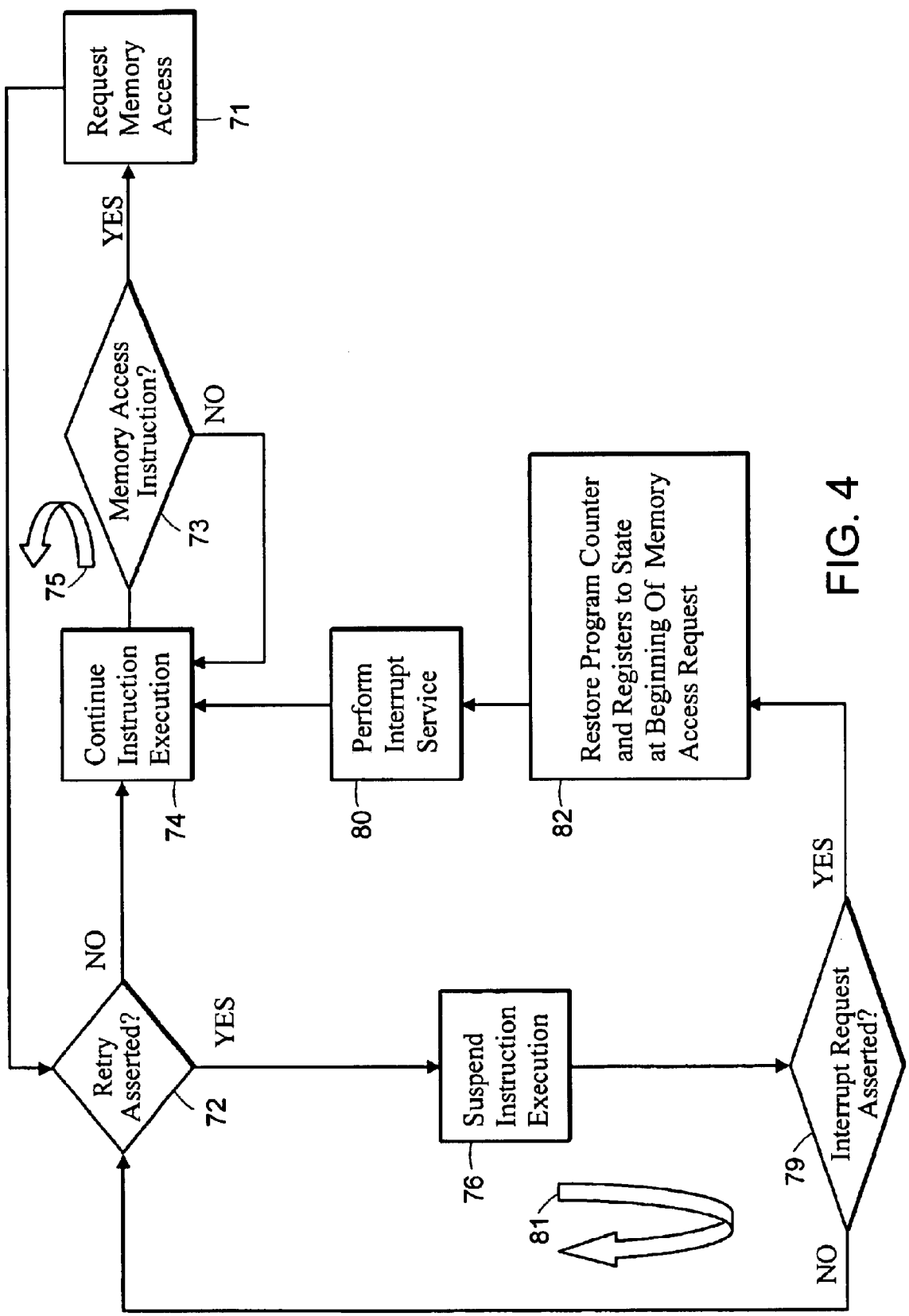
FIG. 4 is a flow diagram showing one embodiment of a method for employing a retry signal in determining whether an interrupt request is serviced.

FIG. 4 outlines one embodiment for a method of servicing an interrupt request during an asserted retry signal. The method may be conveniently discussed beginning with a request for memory access 71 which may arise during the course of instruction execution 74 by a processor. The method of FIG. 4 may be performed by a processor such as CPU 10 of FIG. 1. If no retry signal is asserted in response to memory access request 71 ("no" branch of decision box 72), the processor continues in loop 75 of normal instruction execution. If a retry signal is asserted, on the other hand, the current instruction execution is suspended as shown in block 76. Suspension of the instruction execution causes a processor to be in an idling state in which no further processing is performed relevant to the instruction being suspended. Suspension of the instruction execution involves holding control signals and the program counter in suspended state (not allowing the program counter to be incremented, for example). A register may be employed to store the address of the failed instruction during a memory access delay. This address may be used in the event of an interrupt, as described further below. If an interrupt signal is not asserted ("no" branch of block 79), the processor remains in loop 81 associated with the retry state until the retry is de-asserted or an interrupt is received. If an interrupt signal is asserted ("yes" branch of block 79), the processor proceeds to restore the program counter and any critical registers to their states at the beginning of memory access request 71 as depicted in block 82. The processor then proceeds to perform service of the interrupt, including the ISR, to service the requesting I/O device as shown in block 80. In one embodiment, the last portion of the ISR may include restoring the program counter and any registers used during interrupt service to their states at the beginning of memory access request 71. This last portion may also be done subsequent to the ISR in another embodiment. Finally, the processor then continues instruction processing with a reattempt of memory access request 71. It is noted that by storing the current program counter state during an asserted retry signal, this allows the processor to restore the address of the instruction giving rise to the retry state rather than the address of the next instruction.

Figure 5:
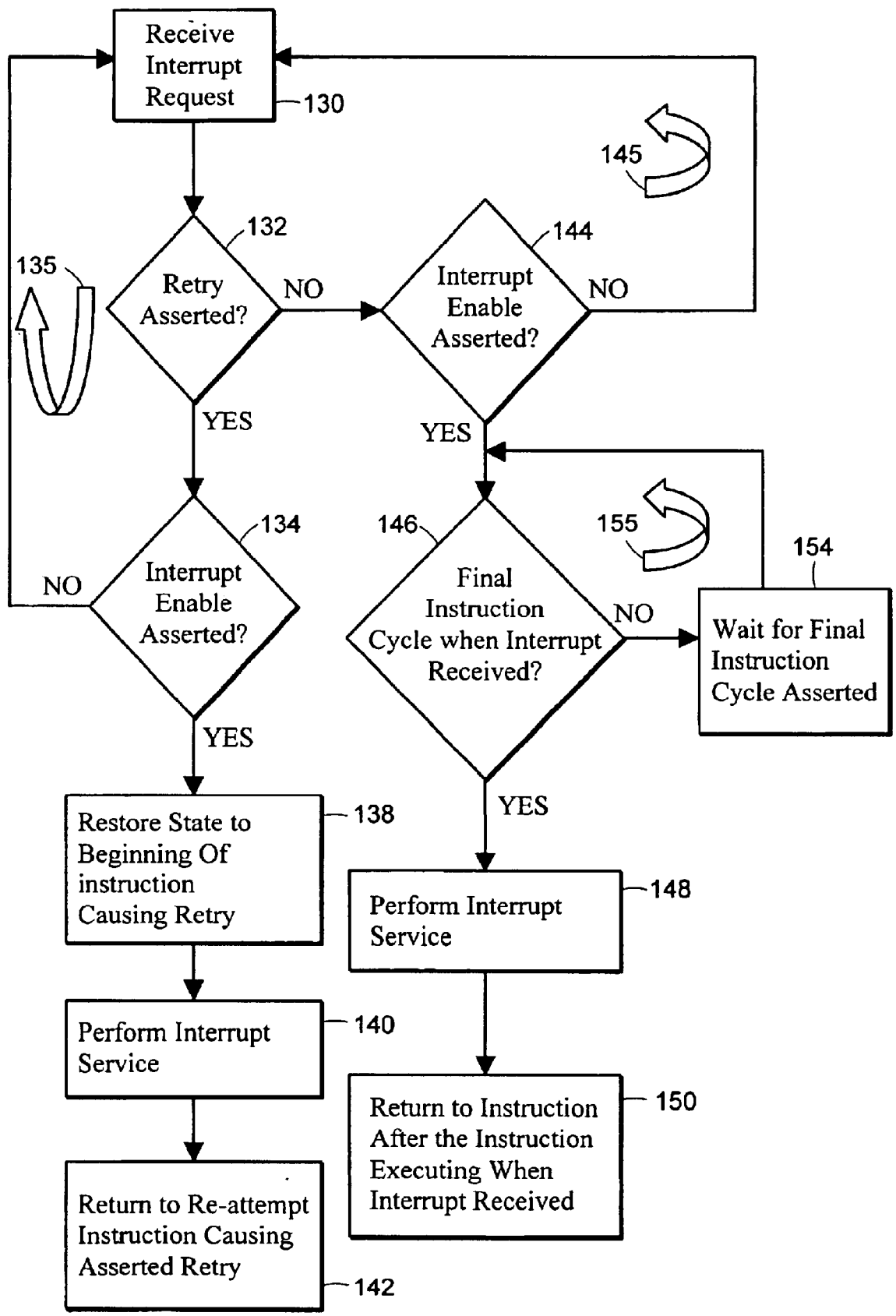
FIG. 5 is a flow diagram showing one embodiment of a method for responding to an interrupt request.

FIG. 5 describes one embodiment of a method of responding to an interrupt request depending on the conditions in which the interrupt request is received. The method may be conveniently discussed beginning with a request 130 for interrupt service by an I/O device 130. If retry signal 32 is asserted ("yes" branch of decision box 132) and an interrupt enable signal (such as signal 96 in FIG. 6) is asserted ("yes" branch of decision box 134), the processor proceeds to restore the program counter and any critical registers to their states at the beginning of the instruction causing the asserted retry signal 32 as shown in block 138. The processor then proceeds to service the interrupt (block 140), which includes the ISR, as described in the above paragraph. Upon completion of the ISR, the processor then returns to re-attempt the instruction causing the asserted retry signal 32 as shown in block 142. If retry signal 32 is asserted and interrupt enable signal 96 is non-asserted ("no" branch of decision box 134), the processor returns to block 130 through loop 135, thereby disregarding the current interrupt request. If retry signal 32 is non-asserted ("no" branch of decision box 132) and interrupt enable signal 96 is non-asserted ("no" branch of decision box 144), the processor also returns to block 130 through loop 145 and disregards the current interrupt request. If retry signal 32 is non-asserted and interrupt enable signal 96 is asserted ("yes" branch of decision box 144), the processor proceeds to query the status of final instruction cycle signal 90. If final instruction cycle 90 is non-asserted ("no" branch of decision box 146), the processor remains in loop 155 until final instruction cycle 90 becomes asserted. On the other hand, if final instruction cycle 90 is asserted ("yes" branch of decision box 146), the processor proceeds to service the interrupt (block 148) and upon completion, returns to the instruction after the instruction executing when the interrupt request was received as shown in block 150. Thus, it can be seen that when retry signal 32 is asserted, upon completion of interrupt service, the processor resumes instruction execution beginning with the instruction causing the asserted retry, whereas when retry signal 32 is non-asserted, the process resumes instruction execution beginning with the next instruction upon completion of interrupt service.

Multiple variations of the methods outlined in FIGS. 3, 4, and 5 are possible and contemplated. For example, the order of some of the steps shown in these flows diagrams may be varied. For instance, in FIG. 5, decision block 144 and decision block 146 may be reversed in order of execution and in FIG. 3, block 70 may be performed prior to or after block 66.

Figure 6:
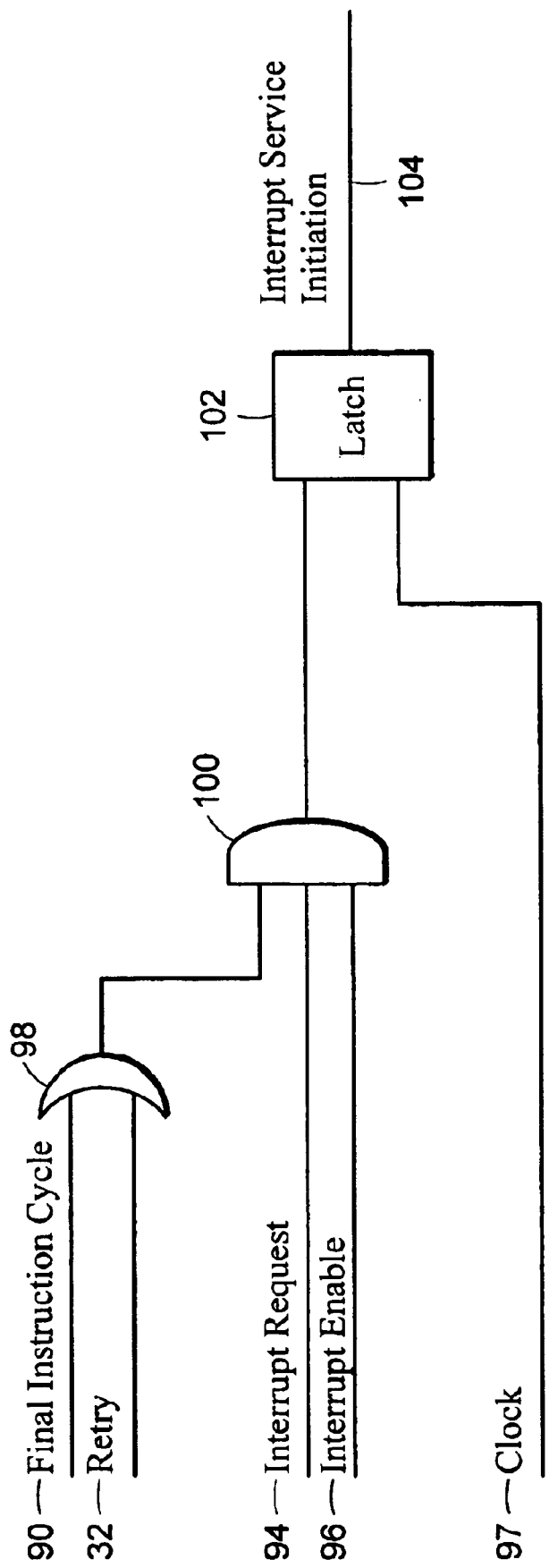
FIG. 6 is a circuit diagram showing one embodiment of a circuit used for employing a retry signal in determining the status of an interrupt service initiation signal.

FIG. 6 illustrates one embodiment of a circuit employing retry signal 32 in determination of whether to service an interrupt request during a memory access delay. A logical OR is performed on retry signal 32 and final instruction cycle signal 90, which indicates that a final cycle of an instruction has been performed. If either retry signal 32 or final instruction cycle signal 90 is asserted, the output of OR gate 98 will be asserted. The output of OR gate 98 serves as one of three inputs to AND gate 100, with the remaining inputs comprising interrupt request signal 94 and interrupt enable signal 96. Interrupt enable signal 96 may be used to temporarily disable service of an interrupt request during execution of instructions which may be critical to be executed unperturbed. A logical AND is performed on the output of OR gate 98, interrupt request signal 94 and interrupt enable signal 96. The output of AND gate 100 is asserted, if and only if, all of its three inputs signals are asserted. In this case, this translates into a state in which either final cycle of an instruction signal 90 or retry signal is asserted, and both interrupt request signal 94 and interrupt enable signal 96 are asserted. The output of AND gate 100 is forwarded as the input to latch 102. Latch 102 stores the output of AND gate 100 and transfers its status upon an active edge of clock cycle 97. The output of latch 102 is interrupt service initiation signal 104, which is asserted when an interrupt request may be serviced during a period of delayed memory access.

Figure 7:
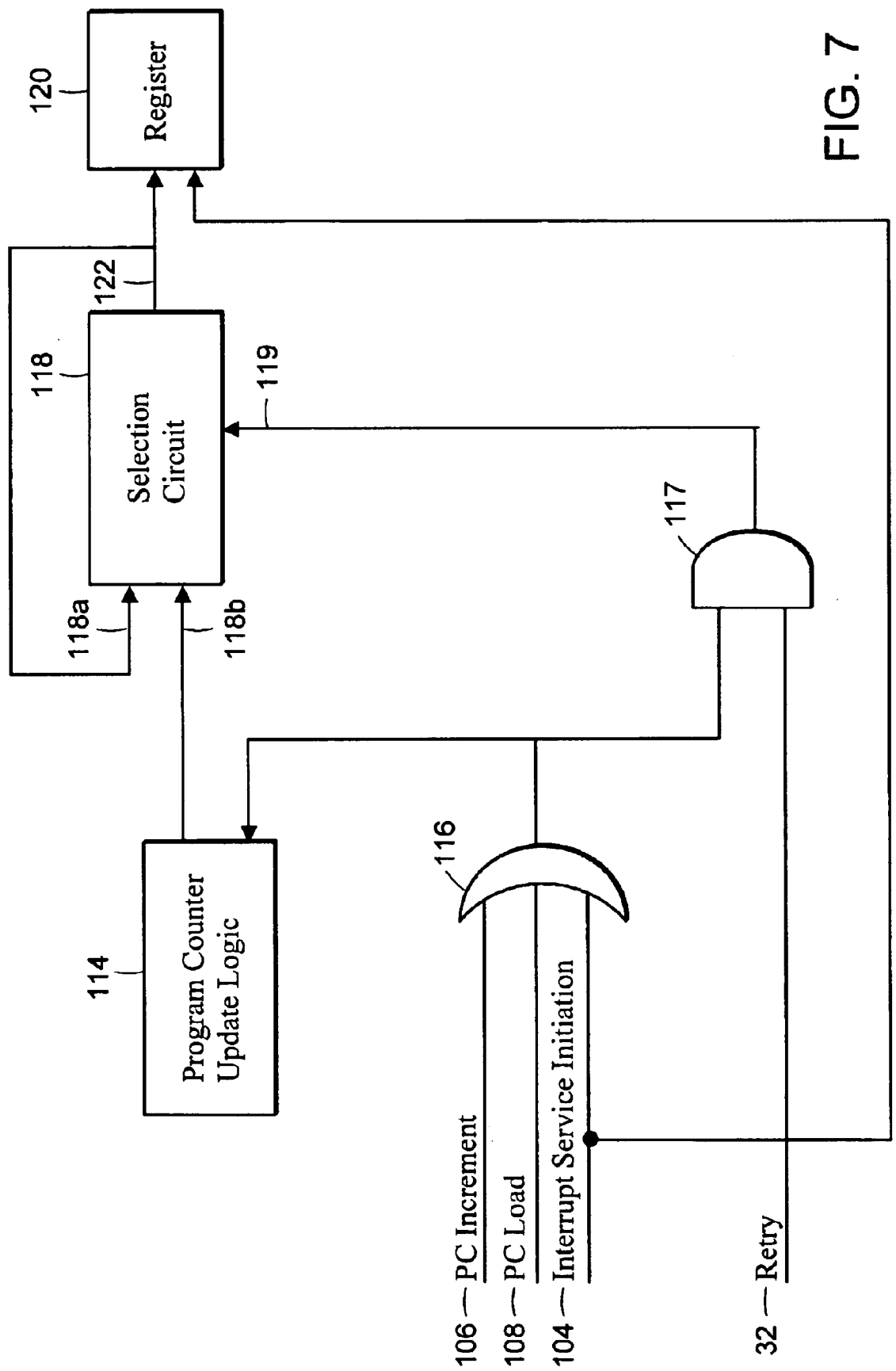
FIG. 7 is a circuit diagram showing one embodiment of a circuit used for employing a retry signal in storing an appropriate program counter address.

FIG. 7 illustrates one embodiment of a circuit employing retry signal 32 to store an instruction address corresponding to the current instruction during a period of delayed memory access. Program counter (PC) increment signal 106, PC load signal 108, and interrupt initiation service signal 104 serve as three inputs to OR gate 116. Assertion of signals 104 or 106 results, under various circumstances, in incrementing of the PC to point to the address of the next instruction to be executed. In a conventional processor, initiation of an interrupt service also causes the program counter to be incremented. Assertion of anyone of signals 104, 106 or 108 causes the output of OR gate 116 to be asserted, which in turn activates program counter update logic 114. The output of OR gate 116 serves as inputs to both program counter update logic 114 and AND gate 117. Program counter update logic 114 is employed to increment the program counter so that the next instruction address may be fetched in a subsequent clock cycle by the CPU. When the output of OR gate 116 is asserted, program counter update logic 114 increments to the next instruction address. When the output of OR gate 116 is non-asserted, program counter update logic 114 keeps the current instruction address. When retry signal 32 is active in the case of the system and method described herein, however, a non-incremented program counter is used upon receiving an interrupt. In the embodiment of FIG. 7, storage of this non-incremented program counter is accomplished by employing AND gate 117. AND gate 117 includes retry signal 112 and the output of OR gate 116 as its inputs. The output of AND gate 117 is forwarded to selection circuit 118 as control input 119. In one embodiment, selection circuit 118 may be a multiplexed flip-flop circuit. Depending on whether control input 119 is asserted or non-asserted, the signal on either input 118a or input 118b will be selected and produced upon output 122 of selection circuit 118. Input 118b is received from program counter update logic 114 and is associated with the next instruction address value. In one embodiment, when control input 119 is asserted, input 118a is selected and when control input 119 is non-asserted, input 118b is selected. Output 122 is forwarded to register 120, where it is stored for future access by CPU 10, and is also fed back into input 118a. This feedback loop allows selection circuit 118 to maintain the current program counter status to store in register 120 whenever control input 119 is asserted. Register 120 receives output 122 upon whenever interrupt service initiation signal is asserted.

In the embodiments of FIGS. 6 and 7, the inputs to gates 98, 100, 116 and 117 are active-high signals. The gates are meant to represent functionality rather than specific circuitry. Thus, the circuit, and other circuits shown herein, could of course be modified to work with active-low signals, for example by employing inverting NAND and/or NOR gates. In addition, if a combination of active-high and active-low signals is used as the inputs to gates 98, 100, 116 and 117, a combination of AND/NAND and/or OR/NOR gates may be used accordingly.

Figure 8A:
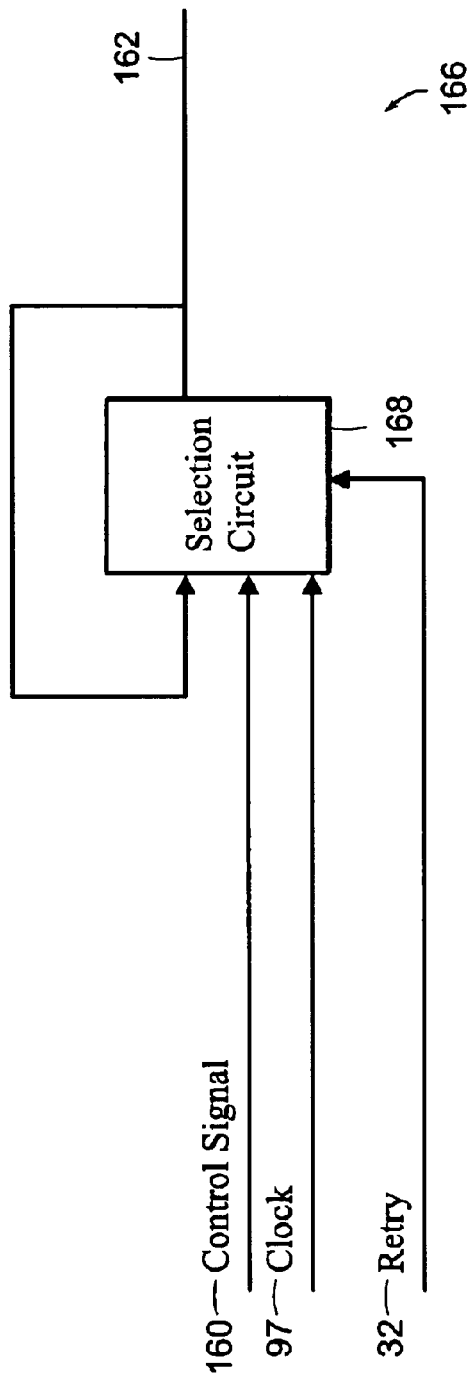
FIG. 8 is a circuit diagram showing one embodiment of a circuit used for employing a retry signal in maintaining the state of a control signal.
Figure 8B:
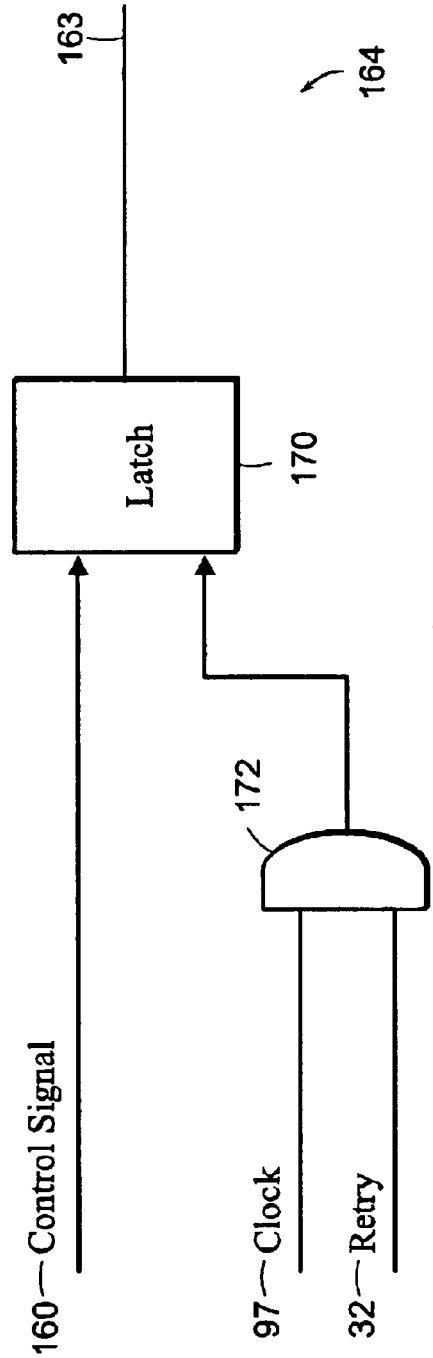

FIG. 8 illustrates embodiments of a circuit employing retry signal 32 in retaining control signals at their same state. Two exemplary circuits are shown. Circuit 166 in FIG. 8(a) may be used when the control signals are generated by selection circuit 168 and circuit 164 of FIG. 8(b) may be used when the control signals are generated by latch circuit 170. In one embodiment, selection circuit 168 may be a multiplexed flip-flop circuit. Circuit 166 employs selection circuit 168, which receives the states of control signal 160, clock signal 92, retry signal 32, and output 162 as its inputs. Retry signal 32 is the control input by which an assertion of retry signal 32 results in output 162 to remain in the same state. When retry signal 32 is non-asserted, the "new" state of control signal 160 appears at output 162, and also becomes the next "current" state due to the feedback employed. Alternatively, circuit 164 employs latch circuit 170, which receives the state of control signal 160 and the output of AND gate 172 as its inputs. AND gate 172 comprises clock signal 97 and retry signal 32 as its inputs. The output of AND gate 172 is asserted when both clock signal 97 and retry signal 32 are asserted. When output of AND gate 172 is asserted, the states of control signals 160 is stored in latch 168 and appears at output 163. When output of AND gate 172 is non-asserted, output 163 retains its current status.

It will be appreciated by those skilled in the art having the benefit of this disclosure that this invention is believed to provide a method and a system for handling exceptions such as an interrupt request. Furthermore, it is also to be understood that the form of the invention shown and described above is to be taken as exemplary, presently preferred embodiments. Various modifications and changes may be made without departing from the spirit and scope of the invention as set forth in the claims. For example, an embodiment may have exception handling embedded in a processor or a memory controller. In another embodiment, the memory system may be embedded in the processor. Furthermore, the methods and system described herein may be implemented using many combinations of hardware and/or software, and at one or more of many different levels of hardware and/or software, as is the case with many computer-related applications. It is intended that the following claims be interpreted to embrace all such modifications and changes.

What is claimed is:

1. A method for handling an interrupt signal received by a processor, said method comprising initiating an interrupt service in response to the interrupt signal if a retry signal is asserted, regardless of a degree of completion of an instruction by the processor, wherein the retry signal is associated with a memory access attempted by the processor.

2. The method as recited in claim 1, wherein said initiating the interrupt service comprises:

receiving an asserted retry signal when the memory access is delayed, wherein said asserted retry signal corresponds to a suspension of instruction execution by the processor; and receiving a non-asserted retry signal when the memory access is not delayed.

3. The method as recited in claim 1, wherein said initiating interrupt service is performed within a predetermined time interval after receipt of an asserted interrupt signal.

4. The method as recited in claim 3, wherein said initiating interrupt service is performed in response to a first clock signal transition following the receipt of the asserted interrupt signal during which the asserted retry signal is also present.

5. The method as recited in claim 1, further comprising:

completing the interrupt service; and subsequently resuming instruction execution by the processor beginning with a last instruction attempted.

6. The method as recited in claim 5, further comprising resetting a program counter of the processor to point to said last instruction attempted.

7. The method as recited in claim 5, wherein said last instruction attempted comprises the memory access attempted by the processor.

8. A processor, comprising exception handling logic adapted to initiate service of an exception received while waiting for completion of a memory access attempted by the processor, wherein the exception handling logic comprises interrupt handling logic adapted to produce an interrupt service initiation signal as a function of an interrupt request signal and a retry signal, wherein the retry signal is associated with the memory access attempted by the processor, and wherein the interrupt service initiation signal is asserted when both the interrupt request signal and the retry signal are asserted, and wherein said asserted retry signal corresponds to a delay of the memory access.

9. The processor as recited in claim 8, wherein the interrupt handling logic comprises:

a first circuit adapted to generate an asserted first output signal when either the retry signal or an instruction completion signal is asserted, wherein the instruction completion signal is associated with completion of a last portion of an instruction execution; and a second circuit adapted to generate an asserted second output signal when both the first output signal and the interrupt request signal are asserted.

10. The processor as recited in claim 9, wherein the interrupt service initiation signal is produced upon an output terminal, and wherein the processor further comprises a latching circuit adapted to transfer the second output signal to the output terminal.

11. A processor, comprising:

address selection logic adapted to select an instruction address as a function of a retry signal and an interrupt service initiation signal, wherein the retry signal is associated with a memory access attempted by the processor and the interrupt service initiation signal enables initiation of interrupt service in response to an interrupt request signal; and wherein the address selection logic comprises:

a first circuit adapted to generate an asserted first output signal when both the retry signal and the asserted interrupt service initiation signal are asserted; and a second circuit adapted to select the instruction address as a function of the first output signal.

12. The processor as recited in claim 11, further comprising a register adapted to receive and store the instruction address in response to assertion of the interrupt service initiation signal.

13. The processor as recited in claim 11, wherein the second circuit is adapted to select an instruction address of the memory access in response to an asserted retry signal.

14. The processor as recited in claim 13, wherein the second circuit comprises a selection circuit having its output connected to one of two inputs.

15. The processor as recited in claim 11, further comprising interrupt handling logic adapted to produce the interrupt service initiation signal as a function of the interrupt request signal and the retry signal.

16. The processor as recited in claim 15, wherein the interrupt handling logic comprises:

a third circuit adapted to generate an asserted second output signal when either the retry signal or an instruction completion signal are asserted, wherein the instruction completion signal is associated with completion of a last portion of an instruction execution; and a fourth circuit adapted to generate an asserted third output signal when both the second output signal and the interrupt request signal are asserted.

17. The processor as recited in claim 11, wherein the interrupt service initiation signal is asserted when both the interrupt request signal and the retry signal are asserted, wherein said asserted retry signal corresponds to a delay of the memory access.

* * * * *